(12) United States Patent
Maier

(10) Patent No.: US 6,369,367 B1
(45) Date of Patent: Apr. 9, 2002

(54) COOKING APPARATUS

(76) Inventor: Christopher Maier, 1302 Forest Walk, Coquitlam, British Columbia (CA), V3B 7V4

( * ) Notice: Subject to any disclaimer, the term of this patent is extended or adjusted under 35 U.S.C. 154(b) by 0 days.

(21) Appl. No.: 09/613,249

(22) Filed: Jul. 10, 2000

(51) Int. Cl.[7] .............................. H05B 3/68; A47J 37/10
(52) U.S. Cl. ..................... 219/450.1; 99/378; 99/422
(58) Field of Search ..................... 219/443.1, 450.1, 219/451.1, 452.11, 455.11; 99/378, 400, 401, 422, 425, 444, 445

(56) References Cited

U.S. PATENT DOCUMENTS

| | | | | |
|---|---|---|---|---|
| 5,355,779 A | * | 10/1994 | O'Brien et al. | 99/446 |
| 5,524,528 A | * | 6/1996 | Yeh | 99/446 |
| 5,970,858 A | * | 10/1999 | Boehm et al. | 99/446 |
| 6,024,014 A | * | 2/2000 | Kasai | 99/425 |

* cited by examiner

*Primary Examiner*—Sang Paik
(74) *Attorney, Agent, or Firm*—Oyen Wiggs Green & Mutala

(57) ABSTRACT

An electrically heated cooking apparatus which can be used for on-table cooking is provided. It has a base which sits on the table and a hat-shaped metal cooking grill with an integral electric heating element.

18 Claims, 5 Drawing Sheets

COOKING APPARATUS

TECHNICAL FIELD

The invention relates to the field of cooking apparatus, and more particularly to an electrically heated device for table-top cooking of meats and vegetables.

BACKGROUND ART

Fondue dishes have long been popular for tabletop cooking of meats or for dipping bread into melted cheese, fruit into melted chocolate or the like. A metal pot is provided for the oil or other liquid to be heated, and a stand for supporting the pot above a heat source which is typically a gelled alcohol type canister of cooking fuel. Each diner is provided with a long fondue fork or skewer onto which each piece of food is skewered for cooking or coating. Such fondue dishes have been very popular in the past due to the novelty and entertainment which comes from various individuals interacting while cooking a food dish. While fondue-type dishes are suitable for small dessert or appetizer items, they are not practical for cooking a full meal due to the low heat input and limited volume of food which can be cooked by each individual. Further, canisters of gelled alcohol are impractical to use, are quickly depleted and can be a fire hazard. There is therefore a need for an electrically heated cooking apparatus which can be used for on-table cooking.

DISCLOSURE OF THE INVENTION

The invention therefore provides a cooking apparatus comprising i) a base; ii) a heat conducting cooking grill adapted for mounting on the base having a central raised section forming a centrally-located top cooking surface provided with a plurality of apertures extending therethrough, an outer liquid-retaining area below the central area, and provided with an electrical heating element in contact with the cooking grill; and iii) means electrically connected to the heating element for receiving a source of electrical power. According to one aspect of the invention, the electrical heating element is embedded in the wall of the cooking grill.

BRIEF DESCRIPTION OF DRAWINGS

In drawings which disclose a preferred embodiment of the invention.

BEST MODES) FOR CARRYING OUT THE INVENTION

Figure 1:
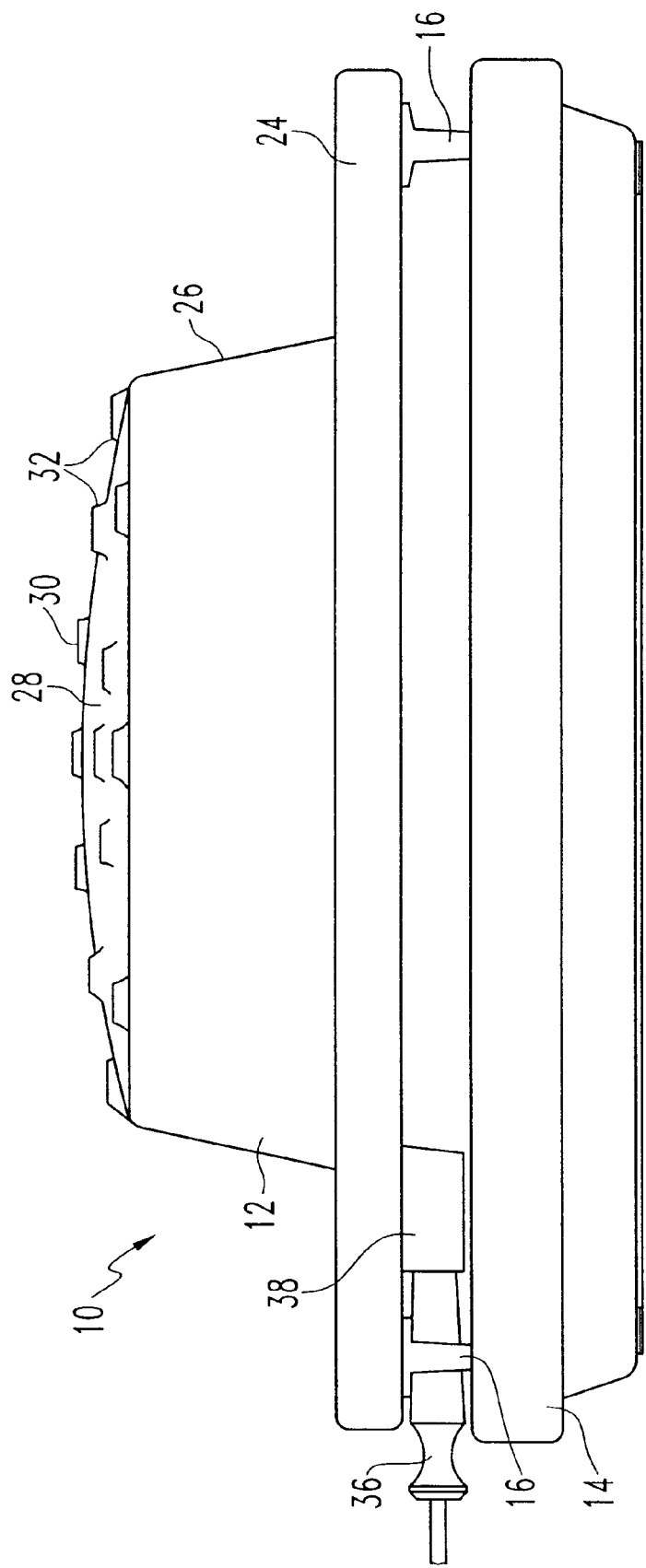
FIG. 1 is a front elevational view of a first embodiment of the invention, incorporating a ceramic base.
Figure 2:
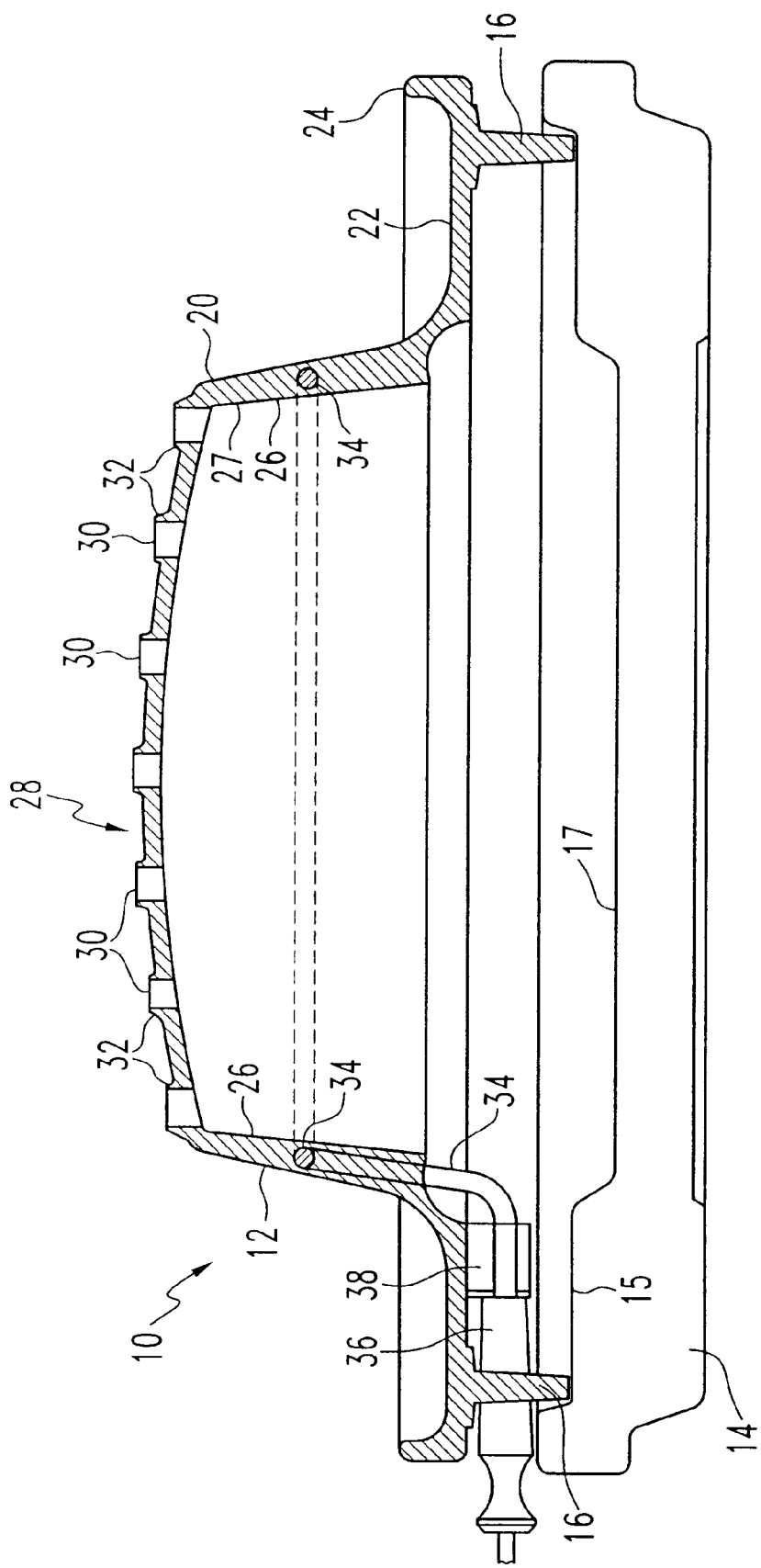
FIG. 2 is a cross sectional view of the embodiment of the invention illustrated in FIG. 1.
Figure 5:
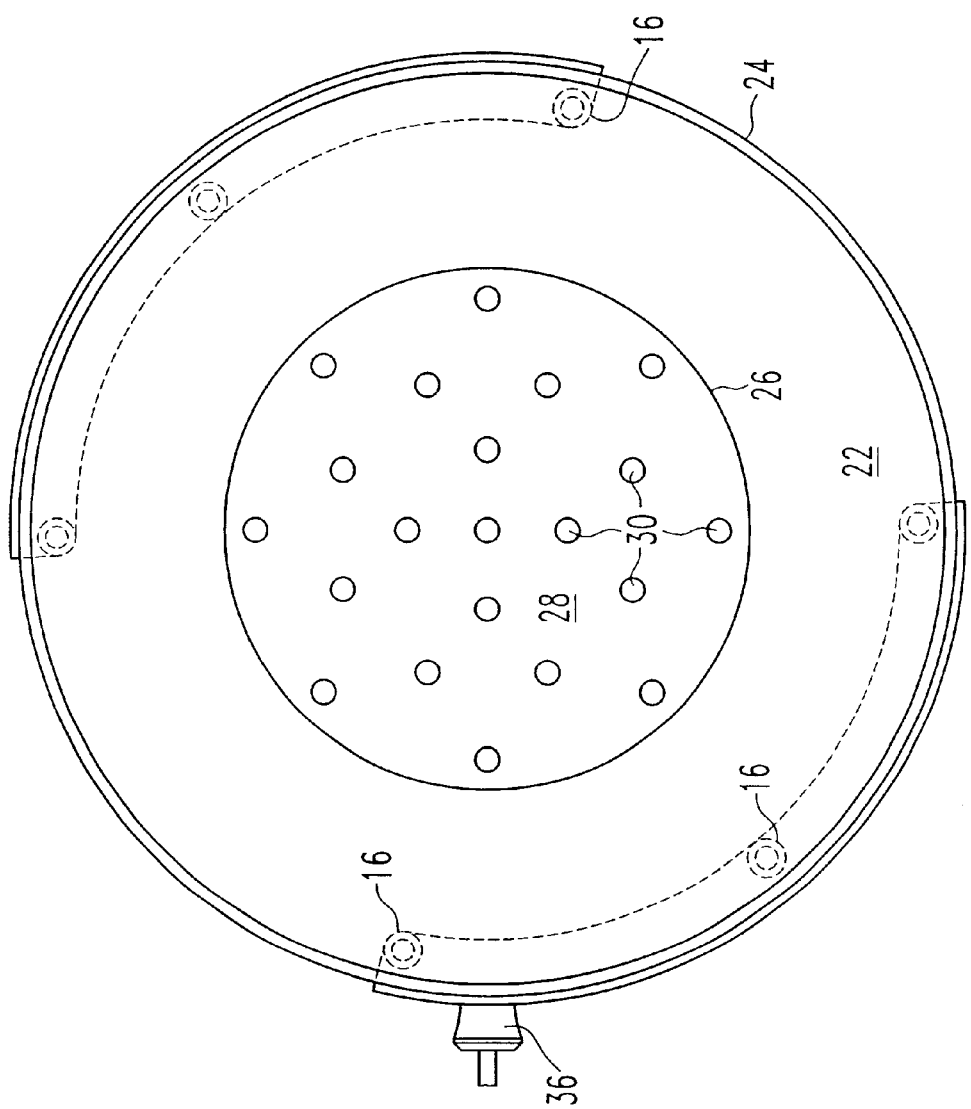
FIG. 5 is a front elevational view of a second embodiment of the invention, incorporating a ceramic base.

With reference to FIGS. 1 and 2, a cooking apparatus 10 according to the invention has a circular cooking grill 12 having legs 16 which sit on circular base 14. Cooking grill 12 is formed of a heat conductive metal such as molded or cast aluminum with integral, or separate metal legs 16. For ease of illustration only two legs are shown in FIG. 1 but at least 3, and as many as 6 legs, as shown in FIG. 5, are used.

If legs 16 are not integrally molded with grill 12 they will be screw threaded into grill 12. Grill 12 is preferably about 15 inches in diameter and 3-½ inches in height from the bottom of rim 22. The invention may also operate without legs on the grill 12 but rather with grill 12 sitting directly on base 14.

Grill 12 has a central raised dome-like section 20 and a connected peripheral rim 22 with raised edges 24. Dome-like section 20 has a steep side wall 26 and upper curved surface 28 provided with an array of circular openings 30, each having raised circular edges 32. Preferably there are 21 openings 30, each about ⅜-inches in diameter. Embedded in wall 26, and extending around its circumference, is a heating element 34 of the type used in electric frying pans or griddles. An electrical plug 36 and socket 38, again of the type commonly used in electric frying pans or griddles supplies electric energy to the heating element 34. The heating element 34 will draw approximately 600 to 1200 watts, depending on the thickness of grill 12, and will be located on side wall 26 so as to provide most heat to upper surface 28 where meat is cooked and lesser heat to rim 22 which will be used to cook vegetables. Preferably heating element 34 has just an on/off switch, but a variable resistor for temperature control can also be provided on plug 36. While heating element 34 is preferably embedded in wall 26, it may also be on the inner surface 27 of wall 26 in contact with the grill 12, or half embedded, half protruding from surface 27. Base 14 is preferably made of ceramic, to insulate the table below from the hot grill 12. It has an annular flat area 15 to receive legs 16 and a central circular depression 17 for receiving any drippings from holes 30, although generally few drippings are found to be experienced in that area due to edges 32 and the upward flow of heat.

Heating element 34 may be cast directly into grill 12, however preferably grooves sized to receive heating element 34 are formed when grill 12 is cast, as well as an extended lip along the edge of the groove, so that the heating element can be placed in the groove after casting and the metal lip crimped down on the element 34 to secure it in place in the grill.

Figure 3:
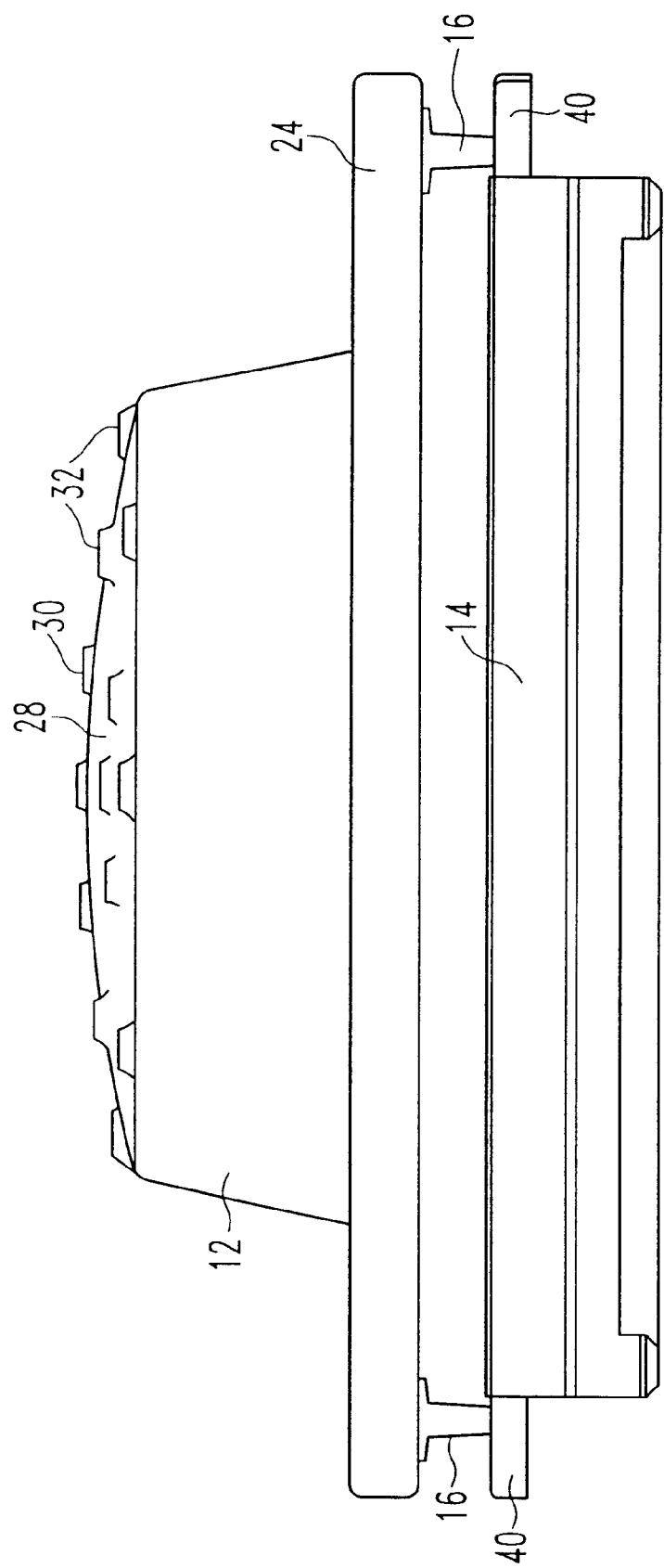
FIG. 3 is a front elevational view of a second embodiment of the invention, incorporating a metal base.
Figure 4:
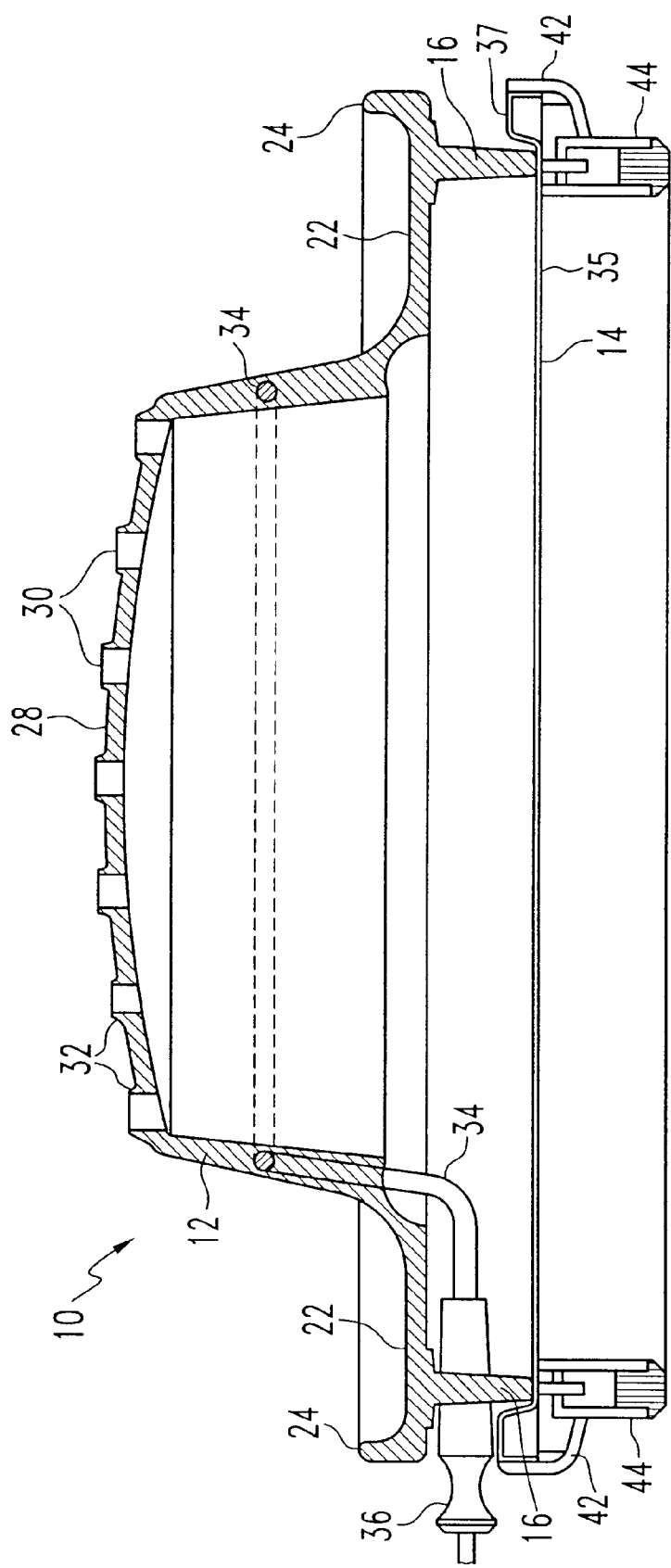
FIG. 4 is a cross sectional view of the embodiment of the invention illustrated in FIG. 1.

FIG. 3 illustrates a variant (with the electrical connections not shown for ease of illustration) in which the base 14 is constructed of metal, with a circular rim 40 to receive the legs 16 of grill 12. The embodiment shown in FIG. 4 and FIG. 5 has a metal base 14 having an annular flat area 35 with rim 37 to receive legs 16. Two plastic handles 42 each extend in an arc partially around the circumference of base 14 and are secured to base 14 by six legs 44 which thread onto screw threads 46 in base 14, shown in FIG. 4 positioned below each leg 16.

In operation, base 14 is placed on a dining table and grill 12 is placed on base 14. Electrical power is provided to heating element 34, which heats grill 12 to the appropriate cooking temperature. Individual users then place pieces of meat for cooking on surface 28 and vegetables on rim 22. Holes 30 provide circulation of heat to the meat pieces. Grease or juices flow around edges 32 and drip into rim 22. Vegetables placed on rim 22 are kept warm and not overcooked due to the lower heat in that area. In this way the cooking apparatus can be used safely on any table to cook both meats and vegetables.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A cooking apparatus comprising:
   i) a heat conducting cooking grill plate having an outer peripheral edge and adapted to be supported on a horizontal surface, said grill plate comprising a central raised section forming a first cooking surface area, a second lower cooking surface area located between said outer peripheral edge of said grill plate and said central raised section, and a transitional surface area sloping upwardly from said second cooking surface area to said first cooking surface area connecting said first and second cooking surface areas and providing a surface for flow of liquid from said first cooking surface area to said second lower cooking surface area, and an electrical heating element integral with said cooking grill plate to thereby provide heat to said first and second cooking surface areas, whereby said electrical beating element is located closer to said first cooking surface area than to said second cooking surface area to provide a higher temperature in said first cooking surface area than in said second cooking surface area, and
   ii) means electrically connected to said electrical heating element for receiving a source of electricity;
      wherein said cooking grill plate is provided with a plurality of apertures extending therethrough in said first cooking surface area.

2. The cooking apparatus of claim 1 wherein said electrical heating element is integral with said cooking grill plate.

3. The cooking apparatus of claim 1 wherein said electrical heating element is located within a recess in said transitional area of said cooking grill plate.

4. The cooking apparatus of claim 1 wherein said electrical heating element is contained in a groove formed in said transitional area of said cooking grill plate.

5. The cooking apparatus of claim 1 wherein said electrical heating element is embedded in said transitional area of said heat conducting cooking grill plate.

6. The cooking apparatus of claim 5 wherein said electrical heating element is partially embedded in said transitional area of said heat conducting cooking grill plate.

7. The cooking apparatus of claim 1 wherein said cooking grill plate is generally circular and comprises a raised outer rim.

8. The cooking apparatus of claim 1 wherein said first cooking surface area comprises a convex upper surface and said transitional area comprises a frusto-conical surface.

9. The cooking apparatus of claim 1 further comprising at least three downwardly extending legs.

10. The cooking apparatus of claim 1 wherein said second cooking area is provided with a raised perimeter to retain liquid therein.

11. The cooking apparatus of claim 1 further comprising a base for supporting said cooking apparatus above and spaced from said horizontal surface.

12. The cooking apparatus of claim 11 wherein said base is heat-insulating.

13. The cooking apparatus of claim 12 wherein said base is manufactured from a ceramic material.

14. The cooking apparatus of claim 11 wherein said base is adapted to retain liquid flowing through said apertures in said cooking grill plate.

15. The cooking apparatus of claim 14 wherein said base comprises a central liquid-retaining depression and an outer annular planar surface for supporting said cooking grill plate.

16. The cooking apparatus of claim 1 wherein said electrical heating element is embedded in said transitional area of said cooking grill plate.

17. The cooking apparatus of claim 1 wherein said apertures in said cooking grill plate have raised outer edges.

18. A cooking apparatus comprising;
   i) a heat conducting cooking grill plate having an outer peripheral edge and adapted to be supported on a horizontal surface, said grill plate comprising a central raised section forming a first cooking surface area, a second lower cooking surface area located between said outer peripheral edge of said grill plate and said central raised section, and a transitional surface area sloping upwardly from said second cooking surface area to said first cooking surface area connecting said first and second cooling surface areas and providing a surface for flow of liquid from said first cooking surface area to said second lower cooking surface area and an electrical heating element integral with said cooking grill plate to thereby provide heat to said first and second cooking surface areas, whereby said electrical heating element is located closer to said first cooking surface area than to said second cooking surface area to provide a higher temperature in said first cooking surface area than in said second cooking surface area; and
   ii) means electrically connected to said electrical heating element for receiving a source of electricity wherein-said first cooking surface area comprises a convex upper surface and said transitional area comprises a frusto-conical surface; wherein said electrical heating element is embedded in said transitional area of said cooking grill plate.

* * * * *